Aug. 1, 1939.  P. W. ROM  2,167,680
VEHICLE SIGNAL APPARATUS
Filed May 29, 1936  2 Sheets-Sheet 1
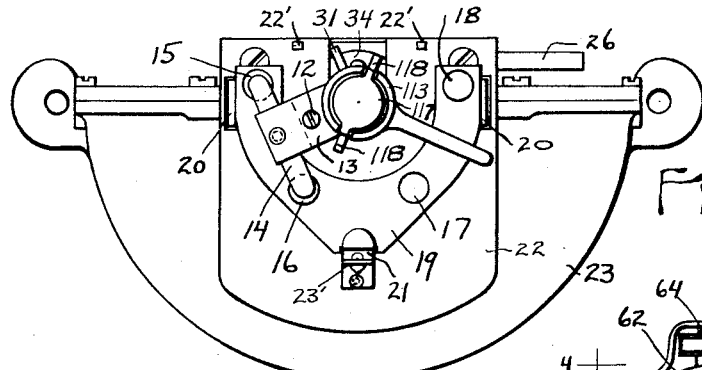
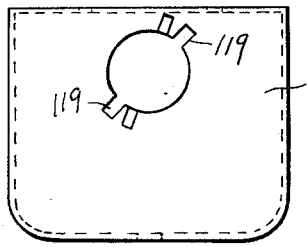
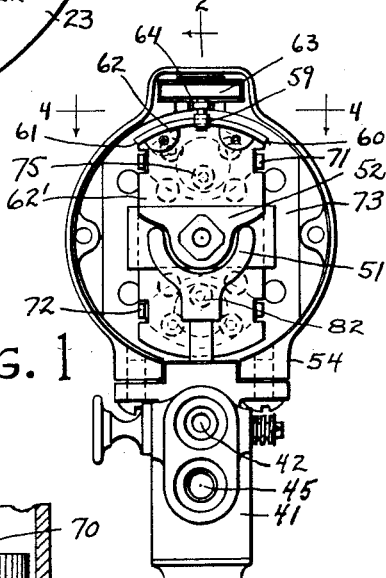
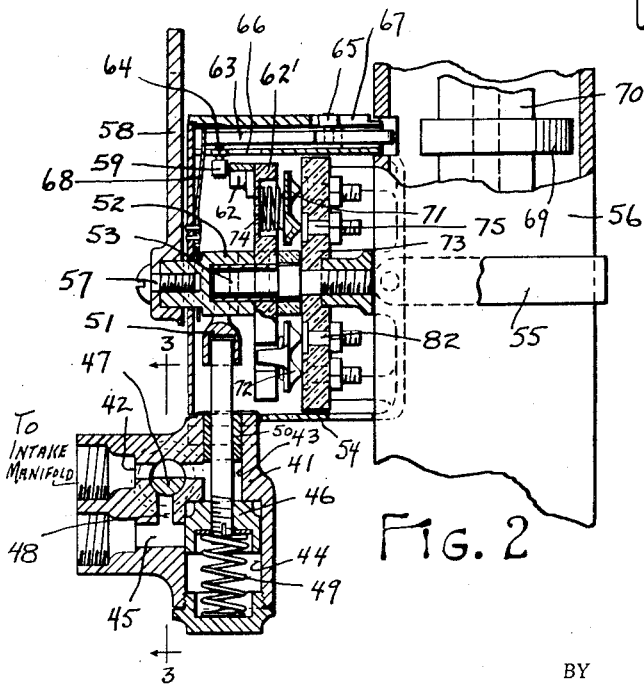
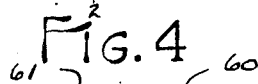
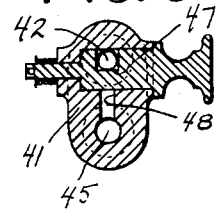
INVENTOR.
Palmer W. Rom
Louis O. French
BY
ATTORNEY.

Aug. 1, 1939. P. W. ROM 2,167,680
VEHICLE SIGNAL APPARATUS
Filed May 29, 1936 2 Sheets-Sheet 2
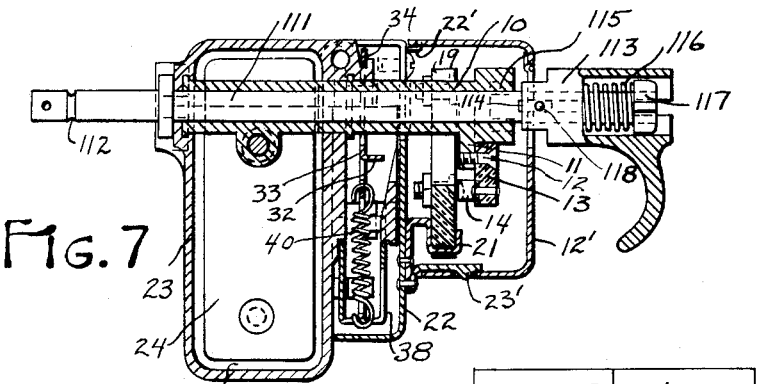
FIG. 7
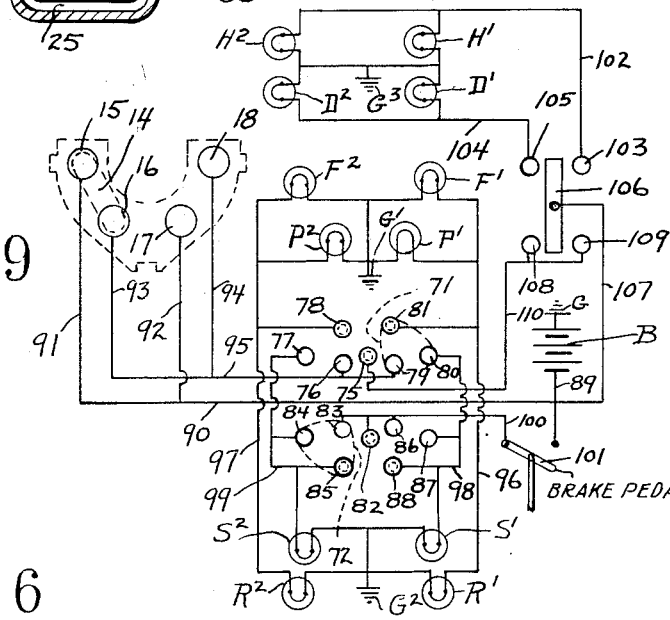
FIG. 9
FIG. 6
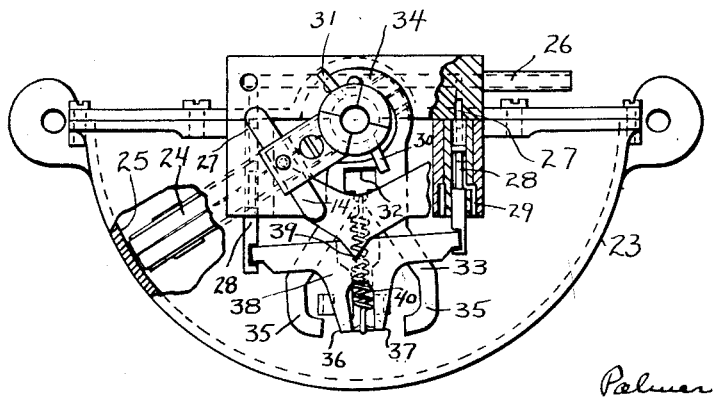
INVENTOR.
Palmer W. Rom
Louis O. French
ATTORNEY.

Patented Aug. 1, 1939

2,167,680

UNITED STATES PATENT OFFICE 2,167,680

VEHICLE SIGNAL APPARATUS

Palmer W. Rom, Cudahy, Wis.

Application May 29, 1936, Serial No. 82,439

7 Claims. (Cl. 177—337)

The invention relates to vehicle signals.

The object of the invention is to provide an apparatus for producing a flashing signal wherein the speed of the flashes and also, if desired, the number of flashes may be varied. More particularly, one feature of the invention is to provide a vacuum operated flasher signal switch mechanism which under the ready control of the operator may be connected up with the motor of the vehicle.

A further object of the invention is to provide an air-motor operated flasher signal switch which is operated on the operation of a directional switch.

A further object of the invention is to provide a flashing signal mechanism which may be set in motion by the operator and automatically stopped through mechanism associated with the steering mechanism of the vehicle.

A further object of the invention is to provide a flasher signal mechanism including the windshield cleaner operating motor of a motor vehicle and in which said motor may be engaged or disengaged at will with the windshield cleaner.

A further object of the invention is to provide a flasher signal mechanism associated with the switch mechanism of a vehicle signalling system to cause marker lights to flash intermittently at one side of the vehicle to indicate a turn.

The invention further consists in the several features hereinafter set forth and more particularly defined by claims at the conclusion hereof.

In the drawings:

Fig. 1 is an end view of part of the apparatus embodying the invention with the front cover plate removed;

Fig. 2 is a detail sectional view taken on the line 2—2 of Fig. 1;

Fig. 3 is a detail sectional view taken on the line 3—3 of Fig. 2;

Fig. 4 is a detail sectional view taken on the line 4—4 of Fig. 1;

Fig. 5 is an elevation view of another part of the apparatus embodying the invention;

Fig. 6 is a view similar to Fig. 5 with parts broken away and parts shown in section;

Fig. 7 is a vertical sectional view through the mechanism shown in Fig. 5 with a front cover member applied thereto;

Fig. 8 is a front view of the front cover member shown in Fig. 5;

Fig. 9 is a wiring diagram of a signalling system including the flasher embodying the invention.

The flasher mechanism embodying the invention includes an air-motor operated oscillatory shaft 10 having an arm 11 to which is secured by a screw 12 an insulating block 13 carrying a resilient bridging contact member 14 which is adapted to connect relatively fixed contacts 15 and 16 together, 16 and 17 together, and 17 and 18 together as said bridging member moves from left to right as viewed in Fig. 5, said fixed contacts being mounted on a block 19 of insulating material secured by bracket arms 20 and 21 to the front face of a casing member 22 which normally forms a part of a windshield cleaner operating air motor 23. A switch housing cover 12' is detachably secured to the casing member 22 by hooks 22' and a spring clip member 23'. This motor includes the oscillatory blade 24 working in a semi-cylindrical casing or cylinder 25 and having automatic valve mechanism for alternately connecting opposite sides of the cylinder with the intake manifold of the engine, so that said blade 24 is oscillated back and forth in said cylinder. The details of this mechanism are old and well known, and parts of one form of device for this purpose are shown in Fig. 6 wherein the numeral 26 designates a pipe for connection with the intake manifold and which is connected to opposite ends of the cylinder by ports 27 which are controlled by valves 28 which are alternately operated to establish communication between said ports with said manifold and through ports 29 with the atmosphere. For alternately operating these valves, arms 30 and 31 on the shaft 10 alternately engage a projection 32 on a trip operating arm 33 mounted at its upper end 34 to oscillate about the casing and having spaced arms 35 alternately engageable with arms 36 and 37 forming a part of the valve tripping arm 38 which is pivoted at 39 to the casing and is normally biased to an inclined position by a spring 40.

For controlling this suction operated motor I provide a valve casing 41 having passages 42, 43, 44, and 45 therein and having valves 46 and 47 associated therewith. The valve 46 is slidably mounted in the passage or bore 44 and controls the flow of air from the passage 45 to the passage 43 which connects with the passage 42 leading to the intake manifold of the engine. The valve 47 is a rotary valve mounted in the casing 41 and acting to reduce or increase the air flow through the passage 42 or to cut off the flow therethrough or to connect the passage 45 directly with the passage 42 through a bypass port 48.

Reducing the flow of air through the passage 42 will cause the blade 24 to operate more slowly, and in this way the motor may be adjusted to give sixty or less strokes a minute.

The valve 46 is normally held closed by a spring 49, and it is slidably mounted in a bushing 50 in the bore 43 and connected to a forked member 51 which engages opposite sides of an oscillatory cam member 52 mounted to turn on a shaft 53 mounted in a casing 54 which is here shown as connected by a clamp 55 to the steering post standard 56 of the vehicle.

The cam member projects out from the casing 54 and is secured by a screw 57 to a manually controlled operating arm 58. Oscillating this arm to either side of its central position oscillates the cam member 52 which in turn acts on the forked member 51 to open and close the valve 46.

In order to hold the valve 46 in its open position so as to permit the motor 23 to operate the flasher switch, means are provided for locking the cam member 52 in either a right or a left position including a catch or locking member 59 adapted to engage behind either the end 60 or the end 61 of a segmental plate 62 of insulating material which is secured to a block 62' connected to turn with the cam 52. The locking member 59 is mounted on a rod 63 guided for longitudinal movement by rollers 64 and 65 working in slots 66 and 67 in the casing 54 and normally urged toward the locking plate by a flat spring 68 anchored at one end to said casing and engaging at its upper end the outer end of said rod. In the closed position of the valve 46 the member 59 is pressed by the spring 68 against the central portion of the front of the plate 62. When the valve 46 is moved to open position by swinging the arm 58 to the right or the left, the member 59 will as previously noted engage either the end 60 or 61 of said plate and act as a stop to prevent its return by the spring 49 which tends to close the valve. During the time that the valve is open the flasher will intermittently open and close a signalling circuit, and this is preferably a turn indicating circuit which is displayed before the turn is to be made and is preferably automatically cut out while the turn is being made by a cam 69 mounted on the steering rod 70 and turning therewith and while being turned engaging the inner end of the rod 63 in either of its locked positions and acting thereon to push it toward the left as viewed in Fig. 2 and thus release it from locking or stopping engagement with the plate 62 and permit the spring 49 to return the valve 46 to closed position to stop the flashing device and at the same time to move the switch controlling the supply of current to the signal to the "off" position.

The switch mechanism is here shown as formed by the block 62' of insulating material carrying bridging contacts 71 and 72 each of which is normally urged toward an insulated contact plate 73 by a spring 74. The plate 73 is mounted in the casing 54 and has a plurality of fixed contacts mounted therein.

Referring to Fig. 9, the plate 73 has the fixed contacts 75, 76, 77, 78, 79, 80, and 81 which cooperate with the bridging contact 71 and fixed contacts 82, 83, 84, 85, 86, 87, and 88 which cooperate with bridging contact 72. A battery B or other suitable source of current connects by conductors 9 and 90 to conductors 91 and 92 leading to the flasher contacts 15 and 17. The other flasher contacts 16 and 18 are connected by conductors 93 and 94 to a conductor 95 connected with the contacts 76 and 79.

The fixed contacts above described are connected in circuit with a series of signal lights for the vehicle such as right and left rear marker lights R' and R$^2$, right and left stop lights S' and S$^2$, right and left front marker lights F' and F$^2$, and right and left instrument board or pilot lights P' and P$^2$. The lights R', P', and F' are connected on one side with a common conductor 96 which is also connected with the contact 81 while the lights R$^2$, P$^2$, and F$^2$ are connected on one side with a common conductor 97 which is also connected with the contact 78. The lights F', F$^2$, P', and P$^2$ have a common ground G' while the lights R', R$^2$, S', and S$^2$ have a common ground G$^2$ and the battery G is grounded. The light S' and contacts 88, 87, and 80 are all connected to a common conductor 98 and the light S$^2$ and contacts 85, 84, and 77 are all connected to a common conductor 99. The contacts 83, 82 and 86 are connected to a common conductor 100 which has the usual stop light switch 101 connected with the brake pedal so as to signal retardation when the brake is applied, said conductor 100 being connected to the conductor 89 leading to the battery.

The headlights are represented by the right and left bright headlights H' and H$^2$ and the right and left dim headlights or filaments D' and D$^2$, both of these sets of lights being connected to a common ground G$^3$. The lights H' and H$^2$ are connected by a conductor 102 with a fixed contact 103, and the lights D' and D$^2$ are connected by a conductor 104 with a fixed contact 105. A movable switch arm 106 connects by conductor 107 with the battery and connects alternately with the contacts 103 or 105, and when in contact with 103 also contacts a contact 108, and when in contact with 105 also contacts a contact 109. Contacts 108 and 109 are connected to a common conductor 110 leading to the fixed contact 75.

With the headlight switch arm 106 contacting the contacts 105 and 109 current from the battery will pass through conductors 89, 107, switch 106, conductor 104, to the dim headlights D' and D$^2$ and at the same time will flow through conductor 110 to contact 75 which under normal conditions is connected by the bridging contact 71 with the contacts 75, 78, and 81, thus connecting the conductors 96 and 97 with the battery, and which it has previously been noted are in circuit with the lights F', F$^2$, P', P$^2$, R', and R$^2$ which are then lighted. With the headlight switch arm 106 contacting the contacts 103 and 108 since the contact 108 is connected to the conductor 110, the lights F', F$^2$, P', P$^2$, R', and R$^2$ will be lighted as before, and the bright headlights or filaments H' and H$^2$ will be lighted by the connection of conductor 102 with the battery.

With the turning of the lever 58 toward the left to signal a left turn the bridging contact 71 connects contacts 76, 77, and 78 together and also the vehicle engine being in operation starts the suction motor driven flasher switch mechanism that intermittently energizes the conductor 95 and hence contacts 76, 77, and 78 and through these contacts and the conductors 97 and 99 intermittently lights the left hand marker lights F$^2$, R$^2$, the pilot light P$^2$, and the stop light S$^2$, the circuits being made only when the contact 14 bridges 15, 16; 16, 17; 17 and 18 during the forward and backward oscillation of the shaft 10. Under these conditions the bridging contact 72 connects 86, 87, and 88 together, thus causing battery current to pass through conductors 100 and 98 to the stop light S' to indicate retardation when the stop light switch 101 is "on".

With the turning of the lever 58 toward the right from its central position to indicate a right turn the bridging contact 71 connects contacts 79, 80, and 81 together and also the vehicle engine being in operation starts the suction motor driven flasher switch mechanism that intermittently energizes the conductor 95 and hence contacts 79, 80, and 81 and through these contacts and the conductors 96 and 98 intermittently lights the right hand marker lights F', R', the pilot light P', and the stop light S', the circuits being made as the contact 14 bridges the pairs of flasher switch contacts 15, 16; 16, 17; 17, 18 during the forward and backward oscillation of the shaft 10. Under these conditions the bridging contact 72 connects 83, 84, and 85 together, thus causing battery current to pass through conductors 100 and 99 to the stop light S² to indicate retardation when the stop light switch 101 is "on".

It is to be noted from the above that the stop warning under the control of the switch 101 does not flash, and with the directional switch in normal position the bridging contact 72 connects contacts 82, 85, and 88 together, thus connecting the conductor 100 with conductors 98 and 99 to light both stop lights S' and S² to signal retardation on the operation of the switch 101.

It is also to be noted that if the marker lights were omitted and the stop lights one at each side of the rear of the vehicle are only used, then the flashing stop light would indicate the direction in which the vehicle is to be turned, and the opposite stop light would be lighted continuously to indicate retardation when the stop light switch 101 is "on".

With the arrangement shown in Fig. 9 the lights controlled by the flasher switch will be given four flashes during each complete oscillation of the shaft 10 and that by connecting the contacts 16 and 17 to a common conductor and 15 and 18 to a common conductor that the only time flashing will occur is when the contacts 15, 16 are bridged to 17, 18 on the forward and return stroke of the bridging contact 14, thus giving two flashes per cycle of the motor 23.

The shaft 10 is a tubular shaft, and a shaft 111 is mounted therein and at its end 112 is adapted for connection with the windshield cleaner blade (n~t shown). This shaft 111 may be connected to the shaft 10 at the will of the operator by a shiftable clutch member 113 slidably keyed to the shaft 111 and provided with keys or jaws 114 engageable in corresponding recesses 115 in the head end of the shaft 10. The clutch member 113 is normally urged to a clutched position by a spring 116 interposed between it and a nut 117 on said shaft, a stop pin 118 on said clutch member cooperating with the front cover member 12' to hold said clutch member in a release position, but permitting its movement to a clutched position when turned so as to bring the ends of the pin 118 into register with the slots 119 on the cover member 12'.

I desire it to be understood that this invention is not to be limited to any particular form or arrangement of parts except in so far as such limitations are included in the appended claims.

What I claim as my invention is:

1. In a device of the character described, the combination with the suction intake of the engine of a vehicle, directional signal lights for said vehicle to indicate a turn, a source of current for said lights, circuit connections from said source of current to said lights, and directional switch means for said circuit connections for selectively controlling the flow of current to said lights, of a motor connected with said suction intake and having an actuating shaft, a valve in said intake connection controlling the operation of said motor, a contact moved by said shaft, fixed contacts cooperating with said first named contact to intermittently close one of said circuit connections through said source of current and directional switch means to the selected one of said signal lights when indicating a turn, and means for simultaneously operating said directional switch means and said valve.

2. In a device of the character described, the combination with the suction intake of the engine of a vehicle, directional signal lights for said vehicle, a source of current for said lights, circuit connections from said source of current to said lights, and directional switch means for said circuit connections for controlling the flow of current to said lights, of a motor connected with said suction intake and having an actuating shaft, a valve in said intake connection controlling the operation of said motor, a contact moved by said shaft, fixed contacts cooperating with said first named contact to intermittently close one of said circuit connections through said source of current and directional switch means to one of said signal lights, means for simultaneously moving said directional switch means to signalling position and said valve to open position, means to return said directional switch to non-indicating position and close said valve, and means, controlled by the turning of the vehicle, for controlling said last named means.

3. In a device of the character described, the combination with the suction intake of the engine of a vehicle, directional signal lights for said vehicle, a source of current for said lights, circuit connections from said source of current to said lights, directional switch means for said circuit connections for controlling the flow of current to said lights, and the steering post of said vehicle, of a motor connected with said suction intake and having an actuating shaft, a valve in said suction intake connection controlling the operation of said motor, a contact moved by said shaft, fixed contacts cooperating with said first named contact to intermittently close one of said circuit connections through said source of current and directional switch means to one of said signal lights, means for simultaneously moving said directional switch means to signalling position and said valve to open position, means for holding said directional switch means and valve in the last mentioned positions, and cam means controlled by said steering post to release said holding means as the vehicle is turned.

4. In a device of the character described, the combination of a connection to the suction intake of the engine of a vehicle, having spaced passages, a spring closed valve normally cutting off one of said passages from the other and biased to closed position through the suction action of said intake, a suction operated motor connected with said connection and controlled by said valve, directional signal lights for said vehicle, a source of current for said lights, electrical circuit connections from said source of current to said lights, directional switch means for selectively controlling said connections, a switch in circuit with said lights through said directional switch means and intermittently operated by said motor to close the circuit connection selected by said switch means, and an actuating connection between said valve and said directional switch means to normalize the latter by the former.

5. In a device of the character described, the combination with the suction intake of the engine of a vehicle, directional signal lights for said vehicle, a source of current for said lights, circuit connections from said source of current to said lights, and directional switch means for said circuit connections for controlling the flow of current to said lights, of a motor connected with said suction intake and having an actuating shaft, a valve in said suction intake connection controlling the operation of said motor, a switch intermittently operated by said shaft and adapted to close one of the circuit connections between said source of current, said directional switch means and said lights, said directional switch means including a movable member connected with said valve to open the same when said directional switch is moved to an indicating position, means for holding said directional switch in an indicating position and said valve in open position, means under the control of the operator for releasing said holding means, and means for simultaneously normalizing said directional switch means and closing said valve.

6. In a device of the character described, the combination with the suction intake of the engine of a vehicle, signal lights for said vehicle to indicate a turn, energizing means for said lights, selective circuit connections between said energizing means and said lights, of a motor operable through connection with said suction intake and having an actuating shaft, a contact moved by said shaft, fixed contacts cooperating with said first named contact to intermittently close the selected circuit connections to the selected signal, manually controlled means for connecting said motor with the suction intake for starting said motor, and means operable on the turning of the vehicle for shutting off the suction intake connection with said motor for stopping said motor.

7. In a signalling system, the combination of a stop light normally used to indicate retardation at each side of the rear portion of the vehicle, a marker light at each side of the rear portion of the vehicle, a source of current for said lights, circuit connections between said source of current and said lights, directional switch means included in said circuit connections for selectively controlling on either side of the vehicle the stop light and marker light on the same side simultaneously, flasher switch mechanism also connected with said source of current through said circuit connections to either of said selected stop light and marker light, and a stop light switch normally controlling the flow of current through the circuit connections of both of said stop lights to indicate retardation whereby synchronous flashing stop and marker lights at one side of the vehicle indicate a turn and the stop light at the opposite side of the vehicle indicates retardation only when the stop light switch is "on".

PALMER W. ROM.

CERTIFICATE OF CORRECTION.

Patent No. 2,167,680.　　　　　　　　　　August 1, 1939.

PALMER W. ROM.

It is hereby certified that error appears in the printed specification of the above numbered patent requiring correction as follows: Page 2, first column, lines 23 and 24, for "of insulating material which is secured to a block 62'" read which is secured to a block 62' of insulating material; line 70, for the numeral "9" read 89; same page, second column, line 14, for "battery G" read battery B; and that the said Letters Patent should be read with this correction therein that the same may conform to the record of the case in the Patent Office.

Signed and sealed this 5th day of September, A. D. 1939.

Henry Van Arsdale, (Seal)　　　　　　　　　　　　　　　Acting Commissioner of Patents.